US009607030B1

(12) United States Patent
Chakra et al.

(10) Patent No.: US 9,607,030 B1
(45) Date of Patent: Mar. 28, 2017

(54) MANAGING ACRONYMS AND ABBREVIATIONS USED IN THE NAMING OF PHYSICAL DATABASE OBJECTS

(71) Applicant: INTERNATIONAL BUSINESS MACHINES CORPORATION, Armonk, NY (US)

(72) Inventors: Al Chakra, Apex, NC (US); Liam Harpur, Skerries (IE); Michal Miklas, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/275,069

(22) Filed: Sep. 23, 2016

(51) Int. Cl.
*G06F 7/00* (2006.01)
*G06F 17/30* (2006.01)
*G06Q 10/06* (2012.01)

(52) U.S. Cl.
CPC .... *G06F 17/30339* (2013.01); *G06F 17/3053* (2013.01); *G06F 17/30312* (2013.01); *G06F 17/30525* (2013.01); *G06Q 10/06* (2013.01)

(58) Field of Classification Search
CPC ............................... G06F 17/276; G06F 17/30
USPC .................................................. 707/803
See application file for complete search history.

(56) References Cited

U.S. PATENT DOCUMENTS

| | | | | |
|---|---|---|---|---|
| 6,212,532 | B1 * | 4/2001 | Johnson | G06F 17/3071 707/999.003 |
| 7,848,918 | B2 * | 12/2010 | Li | G06F 17/28 704/10 |
| 9,256,698 | B2 | 2/2016 | Vincent, III | |
| 9,311,286 | B2 * | 4/2016 | Bank | G06F 17/2276 |
| 2002/0152064 | A1 * | 10/2002 | Dutta | G06F 17/241 704/9 |
| 2008/0033714 | A1 * | 2/2008 | Gupta | G06F 17/277 704/9 |

(Continued)

FOREIGN PATENT DOCUMENTS

WO  WO2015095832  6/2015

OTHER PUBLICATIONS

"Process to Manage Abbreviations", Virginia Information Technologies Agency Enterprise Applications Division Data Management Group, Sep. 2015, pp. 1-11.

*Primary Examiner* — Binh V Ho
(74) *Attorney, Agent, or Firm* — Tutunjian & Bitetto, P.C.; Scott Dobson (57) ABSTRACT

A method and system are provided. The method includes extracting, ranking, and annotating content in (i) forms used on websites, (ii) a source code, and (iii) existing data design projects that include mappings between logical data model objects and physical data model objects. The content is selected from the group consisting of terms and abbreviations for the terms. An extracted term is annotated using an abbreviation for the extracted term, and an extracted abbreviation is annotated using a term for the extracted abbreviation. The method further includes storing, in a knowledge base, the content, respective annotations for the content, and respective ranks for the content. The method also includes, given an input data structure that lacks identifiers of a given type for data objects therein, automatically generating suggested identifiers of the given type for the data objects based on the content, respective annotations, and respective ranks.

19 Claims, 9 Drawing Sheets

(56) References Cited

U.S. PATENT DOCUMENTS

| | | | |
|---|---|---|---|
| 2010/0083346 A1* | 4/2010 | Forman | G06F 21/55 726/1 |
| 2010/0198841 A1 | 8/2010 | Parker et al. | |
| 2012/0084076 A1* | 4/2012 | Boguraev | G06F 17/2735 704/9 |
| 2014/0344284 A1 | 11/2014 | Motwani et al. | |
| 2015/0066480 A1* | 3/2015 | Endo | G06F 17/276 704/9 |
| 2015/0178385 A1 | 6/2015 | Bauchot et al. | |
| 2016/0071511 A1* | 3/2016 | Park | G10L 13/08 704/260 |
| 2016/0117071 A1 | 4/2016 | Horn | |

* cited by examiner

MANAGING ACRONYMS AND ABBREVIATIONS USED IN THE NAMING OF PHYSICAL DATABASE OBJECTS

BACKGROUND

Technical Field

The present invention relates generally to information processing and, in particular, to managing acronyms and abbreviations used in the naming of physical database objects.

Description of the Related Art

Data modelers are sometimes provided with documentation of database objects or data structures in form of data dictionaries. The documentation often includes only the list of the names of the data objects. The names of the data objects can be of a quite technical nature or include abbreviations and acronyms. In many cases, this is a result of reverse engineering of the database instances to physical and logical models for databases of legacy systems that do not include data object descriptions. Another typical reason for missing definitions or labels is in the case of databases which were not created by following model driven or another database design and development methodology. In such cases, the technical names of the data objects are usually not accompanied by their definitions, descriptions or self-explanatory labels that would be easily understandable by a human.

The data object are usually data sets, data fields, columns or tables. The process of defining of the logical names and descriptions for these data objects from the acronyms used in their names is based on the experience and knowledge of the data modeler. This process is sometimes supported by the sample data received with the data documentation or database metadata.

Thus, there is a need for managing acronyms and abbreviations used in the naming of physical database objects.

SUMMARY

According to an aspect of the present invention, a method is provided. The method includes extracting, ranking, and annotating, by a processor, content in (i) one or more forms used on websites, (ii) a source code of open source software available in a source management system, and (iii) one or more existing data design projects that include mappings between logical data model objects and physical data model objects. The content is selected from the group consisting of terms and abbreviations for the terms. An extracted term is annotated using an abbreviation for the extracted term, and an extracted abbreviation is annotated using a term for the extracted abbreviation. The method further includes storing, in a knowledge base, the content, respective annotations for the content, and respective ranks for the content. The method also includes, given an input data structure that lacks identifiers of a given type for data objects therein, automatically generating, by the processor, suggested identifiers of the given type for the data objects based on the content, the respective annotations for the content, and the respective ranks for the content stored in the knowledge base.

According to another aspect of the present invention, a computer program product is provided for managing terms and abbreviations for the terms. The computer program product includes a computer readable storage medium having program instructions embodied therewith. The program instructions are executable by a computer to cause the computer to perform a method. The method includes extracting, ranking, and annotating, by a processor, content in (i) one or more forms used on websites, (ii) a source code of open source software available in a source management system, and (iii) one or more existing data design projects that include mappings between logical data model objects and physical data model objects. The content is selected from the group consisting of the terms and the abbreviations for the terms. An extracted term is annotated using an abbreviation for the extracted term, and an extracted abbreviation is annotated using a term for the extracted abbreviation. The method further includes storing, in a knowledge base, the content, respective annotations for the content, and respective ranks for the content. The method also includes, given an input data structure that lacks identifiers of a given type for data objects therein, automatically generating, by the processor, suggested identifiers of the given type for the data objects based on the content, the respective annotations for the content, and the respective ranks for the content stored in the knowledge base.

According to yet another aspect of the present invention, a system is provided. The system includes a processor for extracting, ranking, and annotating content in (i) one or more forms used on websites, (ii) a source code of open source software available in a source management system, and (iii) one or more existing data design projects that include mappings between logical data model objects and physical data model objects. The content is selected from the group consisting of terms and abbreviations for the terms. An extracted term is annotated using an abbreviation for the extracted term, and an extracted abbreviation is annotated using a term for the extracted abbreviation. The system further includes a knowledge base for storing the content, respective annotations for the content, and respective ranks for the content. The processor, given an input data structure that lacks identifiers of a given type for data objects therein, automatically generates suggested identifiers of the given type for the data objects based on the content, the respective annotations for the content, and the respective ranks for the content stored in the knowledge base.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to managing acronyms and abbreviations used in the naming of physical database objects. It is to be appreciated that while one or more embodiments of the present invention are primarily described with respect to acronyms for the sake of illustration, the present invention can be applied to any form of abbreviation, as readily appreciated by one of ordinary skill in the art, given the teachings of the present invention provided herein.

Advantageously, the present invention can be used to assist a data modeler in building logical representations of physical data base objects or other data structure names that include acronyms. The names of the physical data base objects, such as tables and columns, are often abbreviated due to name length constraints specified by the data base management system. A logical data model is often needed and extracted using reverse engineering in order to analyze and present the metadata and information to the business users in an organization.

In an embodiment, the present invention significantly reduces the time the data modeler needs to understand and translate the names of physical data objects to logical human readable names with the use of knowledge build upon analysis of web forms, source code and existing data design projects.

Figure 1:
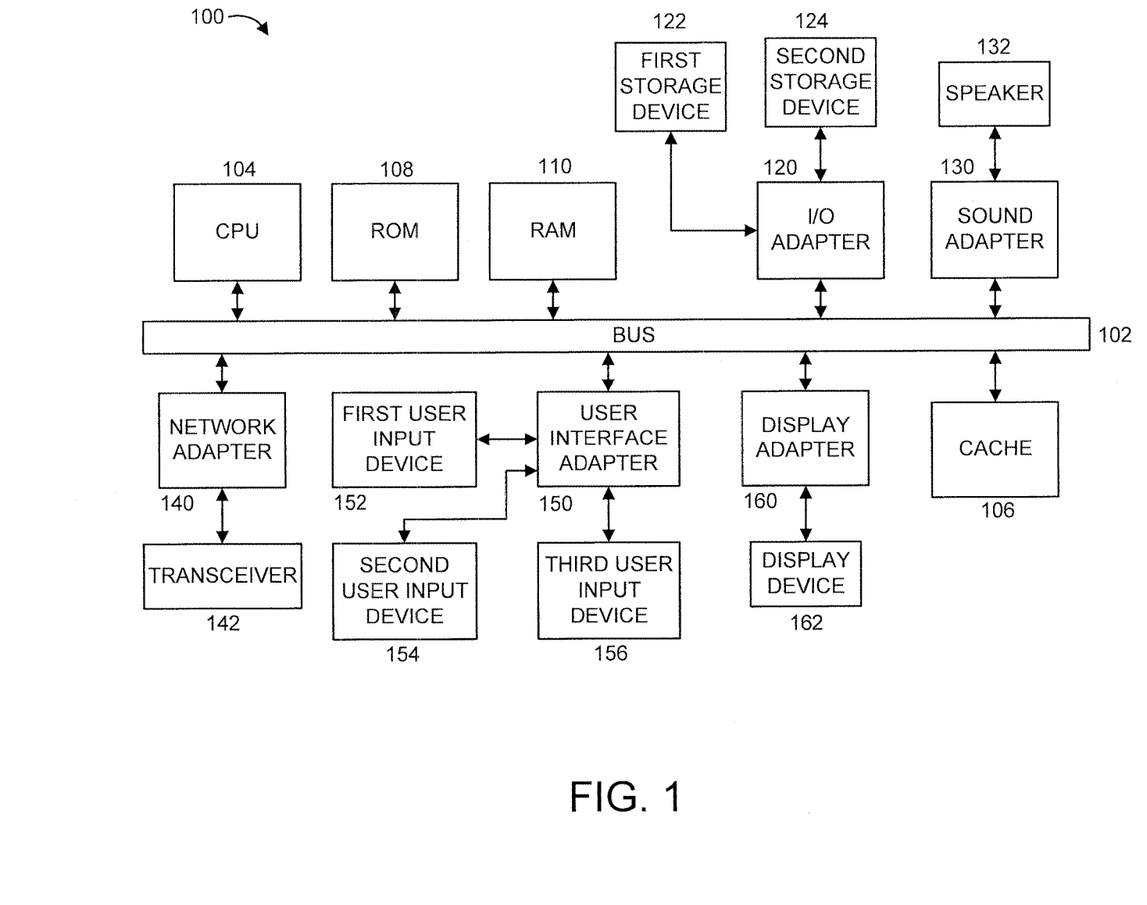
FIG. 1 shows an exemplary processing system 100 to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
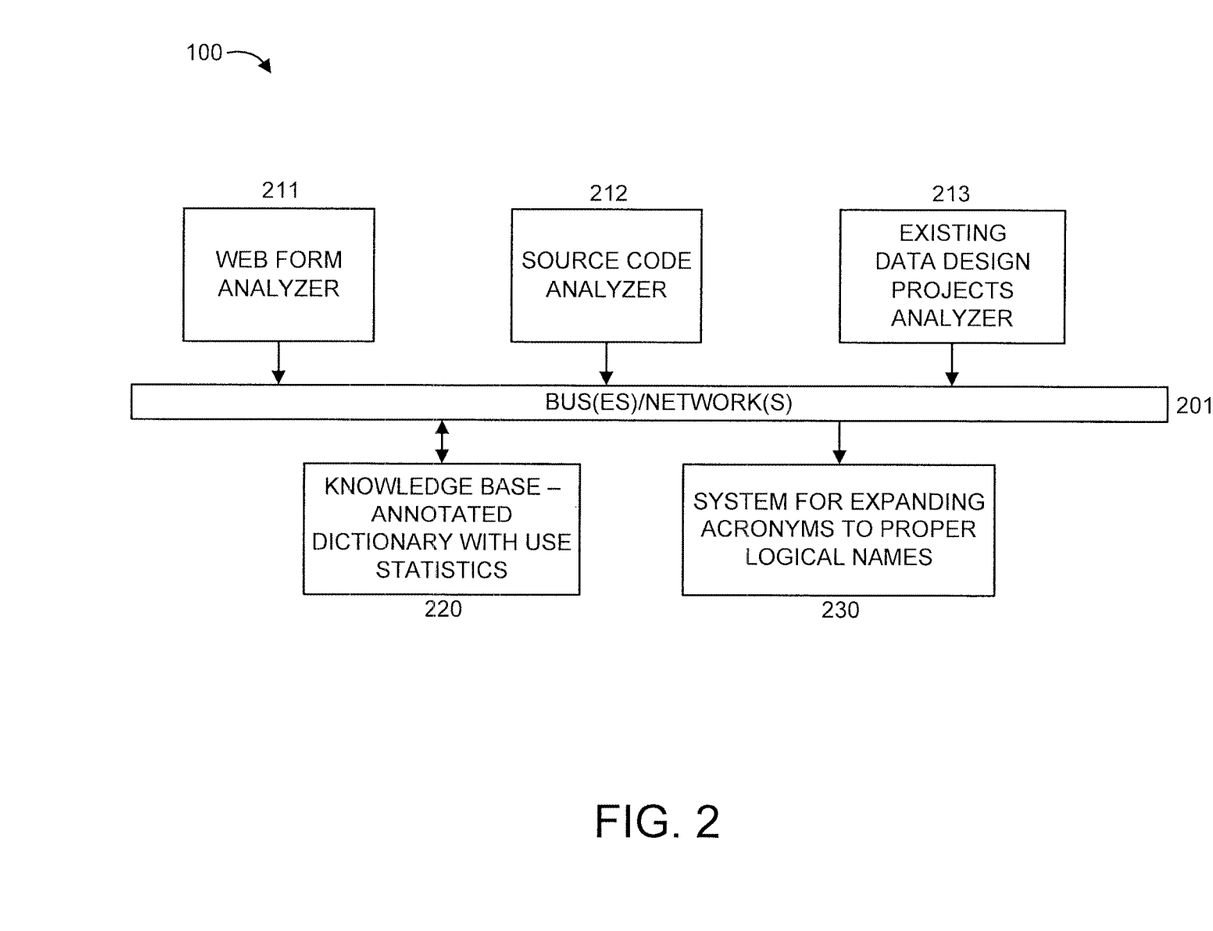
FIG. 2 shows an exemplary system 200 for managing acronyms and abbreviations used in the naming of physical database objects, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
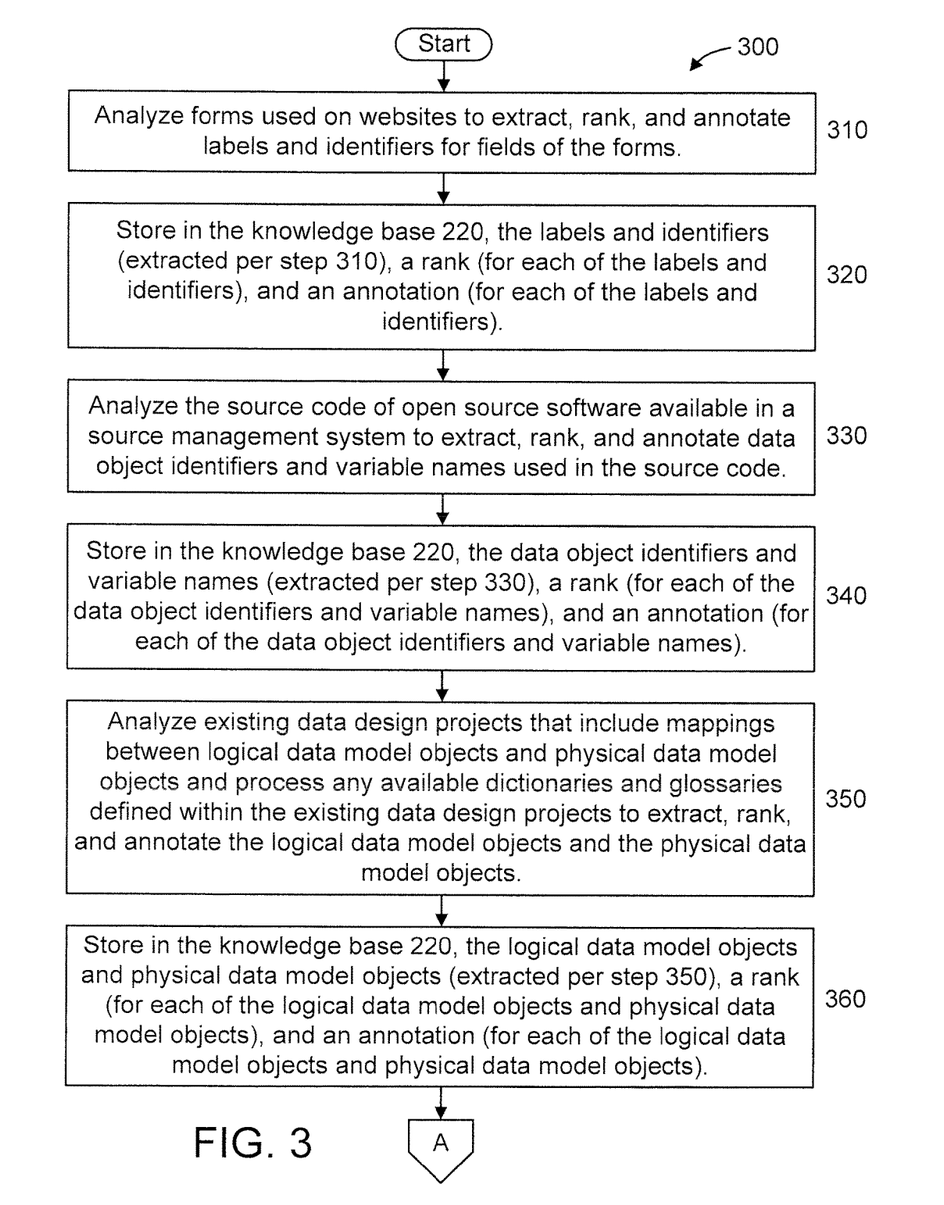
FIGS. 3-4 show an exemplary method 300 for managing acronyms and abbreviations used in the naming of physical database objects, in accordance with an embodiment of the present invention.
Figure 4:
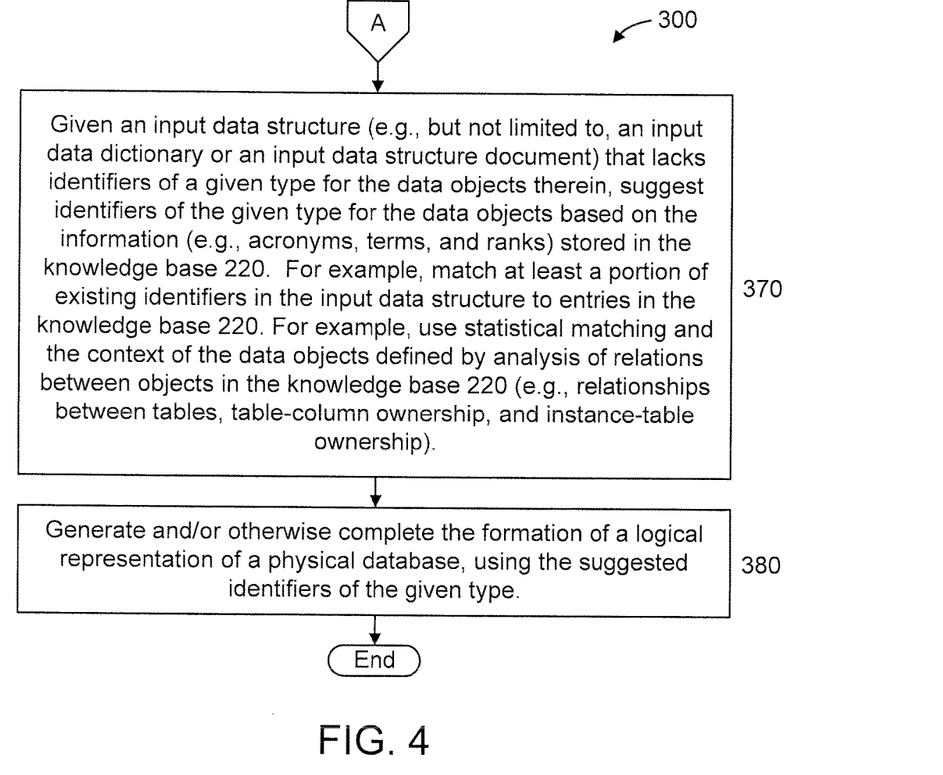

Further, it is to be appreciated that processing system 100 may perform at least part of the method described herein including, for example, at least part of method 300 of FIGS. 3-4. Similarly, part or all of system 200 may be used to perform at least part of method 300 of FIGS. 3-4.

FIG. 2 shows an exemplary system 200 for managing acronyms and abbreviations used in the naming of physical database objects, in accordance with an embodiment of the present invention.

The system 200 includes a web form analyzer 211, a source code analyzer 212, an existing data design projects analyzer 213, a knowledge base—annotated dictionary with use statistics 220, and a system 230 for expanding acronyms to proper logical names. One or more buses and/or networks (hereinafter collectively denoted by the reference numeral 201) interconnect the elements of system 200.

The analyzers 211, 212, and 213 process metadata in order to build ranked pairs of data object names and the name parts with the labels and descriptions.

The web form analyzer 211 analyzes the forms used on websites (e.g., both the Internet and intranet) from which the labels and identifiers of the form fields are extracted, ranked, annotated and added to the knowledge base.

The source code analyzer 212 analyzes the source code of open source software available in a source management system in order to extract data object identifiers and names of variables used in the code to produce the same ranked and annotated pairs of acronyms which are added to the same knowledge base.

The system 230 analyzes existing data design projects that include mappings between the logical data model objects and physical data model objects as well as processes any available dictionaries and glossaries defined within such data design project.

When a data modeler receives a data dictionary or data structure documentation which does not include descriptions and/or labels of the data object, the system 230 is used to suggest descriptions and/or labels by matching the part of the names from the received dictionary of objects with entries build up in the knowledge base by the web form analyzer 211 and the source code analyzer 212. The system 230 uses statistical matches and context of the data objects defined by analysis of relations between objects (relationships between tables, table-column ownership, and instance-table ownership). The data modeler can use the system 230 to go through all the data objects included in the documentation and assign appropriate definitions from a ranked list of suggested labels and definitions for every data object.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration (see, e.g., FIGS. 7-8). Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIGS. 3-4 show an exemplary method 300 for managing acronyms and abbreviations used in the naming of physical database objects, in accordance with an embodiment of the present invention.

At step 310, analyze forms used on websites to extract, rank, and annotate labels and identifiers for fields of the forms. The websites can be on any of, for example, the Internet and/or one or more intranets. Step 310 is performed by the web form analyzer 211.

Figure 5:
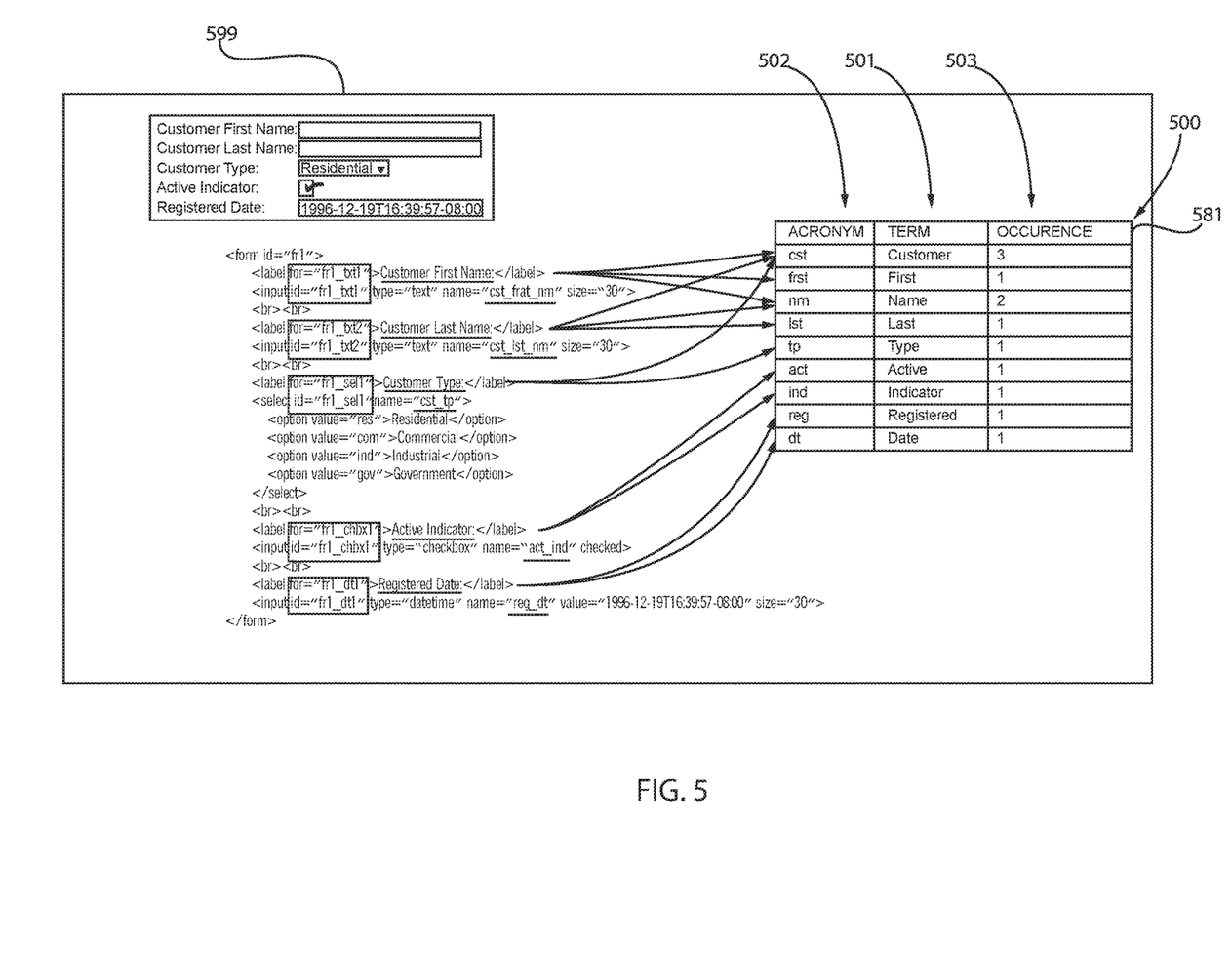
FIG. 5 shows an exemplary analysis result 500 of step 310 of method 300, in accordance with an embodiment of the present invention.

FIG. 5 shows an exemplary analysis result 500 of step 310 of method 300, in accordance with an embodiment of the present invention. In an embodiment, step 310 involves forming triples (also interchangeably referred to herein as "web form triples") as the analysis results 500 of a web form 599, where each triple includes (i) a term 501 used in the form, (ii) an acronym 502 for the term, and (iii) an occurrence value 503 indicating the number of occurrences of the term in the form. The triples are presented in a table 581. In an embodiment, where the form essentially includes the term (as opposed to the acronym for the term), step 310 can involve utilizing the acronym as an annotation for the term. In an embodiment, the occurrence value can be used as the rank. Of course, other metrics can also be used as the rank in step 310, while maintaining the spirit of the present invention.

At step 320, store in the knowledge base 220, the labels and identifiers (extracted per step 310), a rank (for each of the labels and identifiers), and an annotation (for each of the labels and identifiers). In an embodiment, step 320 involves storing web form triples as described above.

At step 330, analyze the source code of open source software available in a source management system to extract, rank, and annotate data object identifiers and variable names used in the source code.

Figure 6:
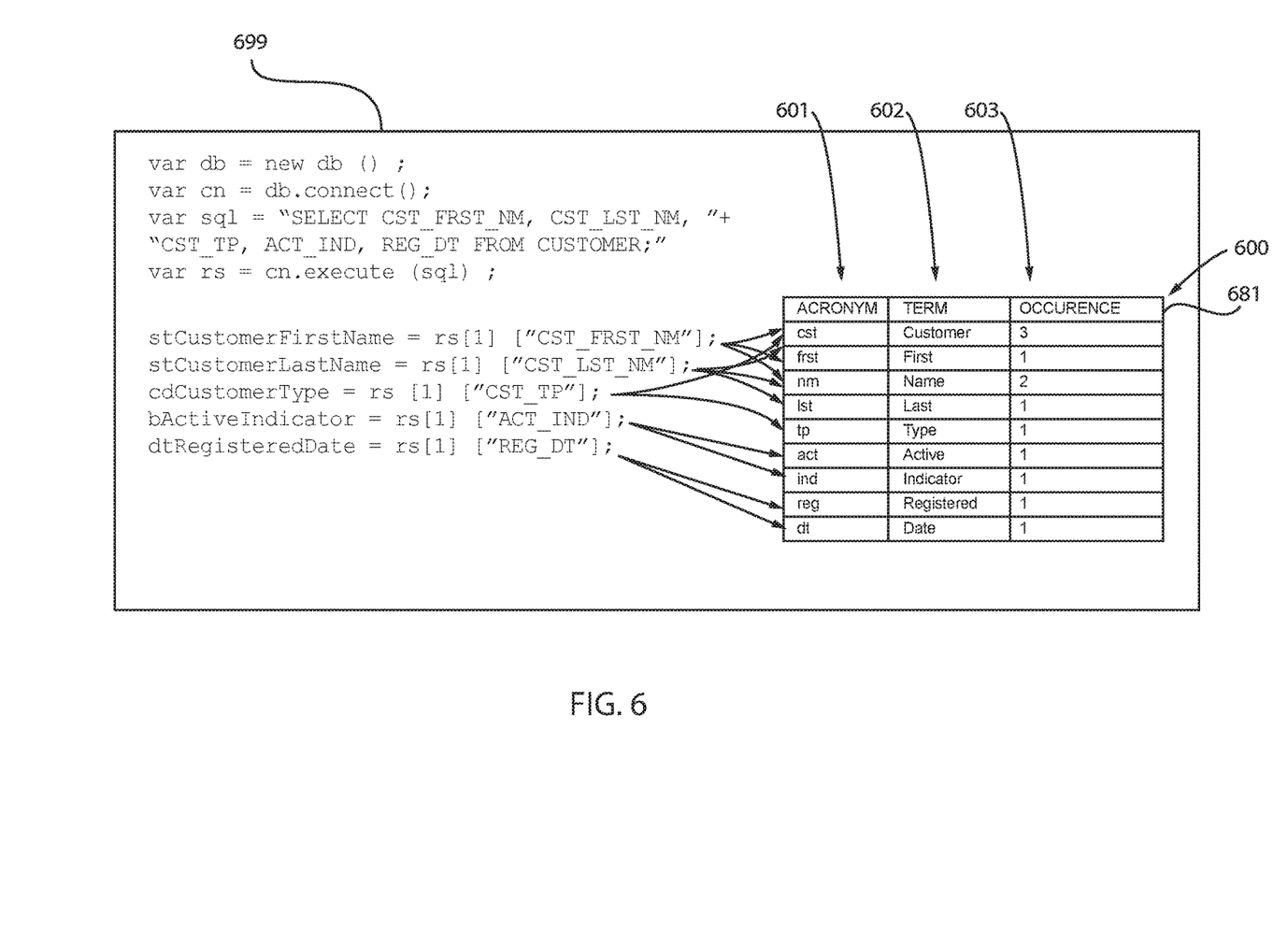
FIG. 6 shows an exemplary analysis result 600 of step 330 of method 300, in accordance with an embodiment of the present invention.

FIG. 6 shows an exemplary analysis result 600 of step 330 of method 300, in accordance with an embodiment of the present invention. In an embodiment, step 330 involves forming triples (also interchangeably referred to herein as "source code triples") as the analysis results 600 of a source code listing 699, where each triple includes (i) an acronym 601 used in the source code, (ii) a term 602 for the acronym, and (iii) an occurrence value 603 indicating the number of occurrences of the acronym in the source code. The triples are presented in a table 681. In an embodiment, where the source code essentially includes the acronym (as opposed to the term the acronym stands for/denotes), step 330 can involve utilizing the term as an annotation for the acronym. In an embodiment, the occurrence value can be used as the rank. Of course, other metrics can also be used as the rank in step 330, while maintaining the spirit of the present invention. Moreover, the rank used in step 330 can be based on a different metric(s) than the rank used in step 310.

In an embodiment, the source code is analyzed (per step 330) to preferably extract, rank, and annotate at least some of the same acronyms as per step 310. Step 330 is performed by the source code analyzer 212.

At step 340, store in the knowledge base 220, the data object identifiers and variable names (extracted per step 330), a rank (for each of the data object identifiers and variable names), and an annotation (for each of the data object identifiers and variable names). In an embodiment, step 340 involves storing source code triples as described above.

At step 350, analyze existing data design projects that include mappings between logical data model objects and physical data model objects and process any available dictionaries and glossaries defined within the existing data design projects to extract, rank, and annotate the logical data model objects and the physical data model objects. Step 350 is performed by the existing data design projects analyzer 213.

Figure 7:
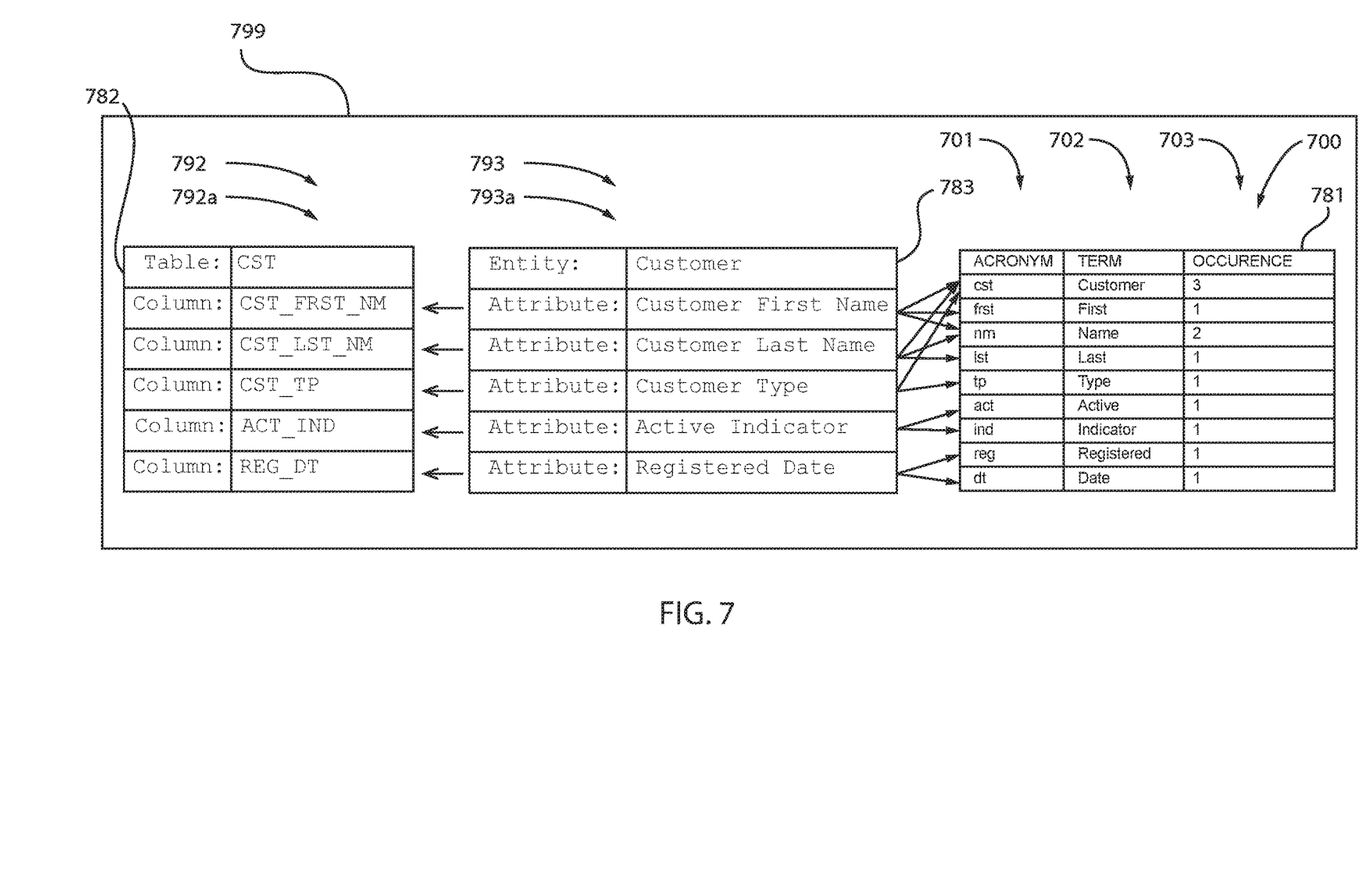
FIG. 7 shows an exemplary analysis result 700 of step 350 of method 300, in accordance with an embodiment of the present invention.

FIG. 7 shows an exemplary analysis result 700 of step 350 of method 300, in accordance with an embodiment of the present invention. In an embodiment, step 350 involves forming triples (also interchangeably referred to herein as "existing projects triples") as the analysis results 700 of an existing data design project 799 that includes mappings 791 between logical data model objects 792A (of a logical data model 792) and physical data model objects 793A (of a physical data model 793), where each triple includes (i) an acronym 701 used in the physical data model 793, (ii) a term 702 for the acronym used in the logical data model 792, and (iii) an occurrence value 703 indicating the number of occurrences of the acronym in the physical data model 793. The physical data model objects 793A are presented in a table 782. The logical data model object 792A are presented in a table 783. The triples are presented in a table 781. In an embodiment, where the physical data model 793 essentially includes the acronym (as opposed to the term the acronym stands for/denotes), step 350 can involve utilizing the term as an annotation for the acronym. In an embodiment, the occurrence value can be used as the rank. Of course, other metrics can also be used as the rank in step 330, while maintaining the spirit of the present invention. Moreover, the rank used in step 350 can be based on a different metric(s) than the rank used in step 310 and/or the rank used in step 330.

At step 360, store in the knowledge base 220, the logical data model objects and physical data model objects (extracted per step 350), a rank (for each of the logical data model objects and physical data model objects), and an annotation (for each of the logical data model objects and physical data model objects). In an embodiment, step 360 involves storing existing projects triples as described above.

At step 370, given an input data structure (e.g., but not limited to, an input data dictionary or an input data structure document) that lacks identifiers of a given type for the data objects therein, suggest identifiers of the given type for the data objects based on the information (e.g., acronyms, terms, and ranks) stored in the knowledge base 220.

In an embodiment, step 370 involves matching (e.g., statistical matching) at least a portion of existing identifiers in the input data structure to entries in the knowledge base 220.

In an embodiment, step 370 involves statistical matching and the context of the data objects defined by analysis of relations between objects in the knowledge base 220 (e.g., relationships between tables, table-column ownership, and instance-table ownership).

In an embodiment, step 370 involves processing the data objects included in the input data structure.

At step 380, generate and/or otherwise complete the formation of a logical representation of a physical database, using the suggested identifiers of the given type.

Further regarding steps 310, 330, and 350 with respect to FIGS. 5, 6, and 7, respectively, while one of an acronym or a term for the acronym was presumed to be in a given item such as the web form (analyzed per step 310), the source code (analyzed per step 330), and the input data dictionary or input data structure document (analyzed per step 350), for which the other one (of the acronym or the term for the acronym) was used as an annotation, the converse can also apply to each of these steps. In such a converse situation, the present invention is readily applied by one of ordinary skill in the art given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
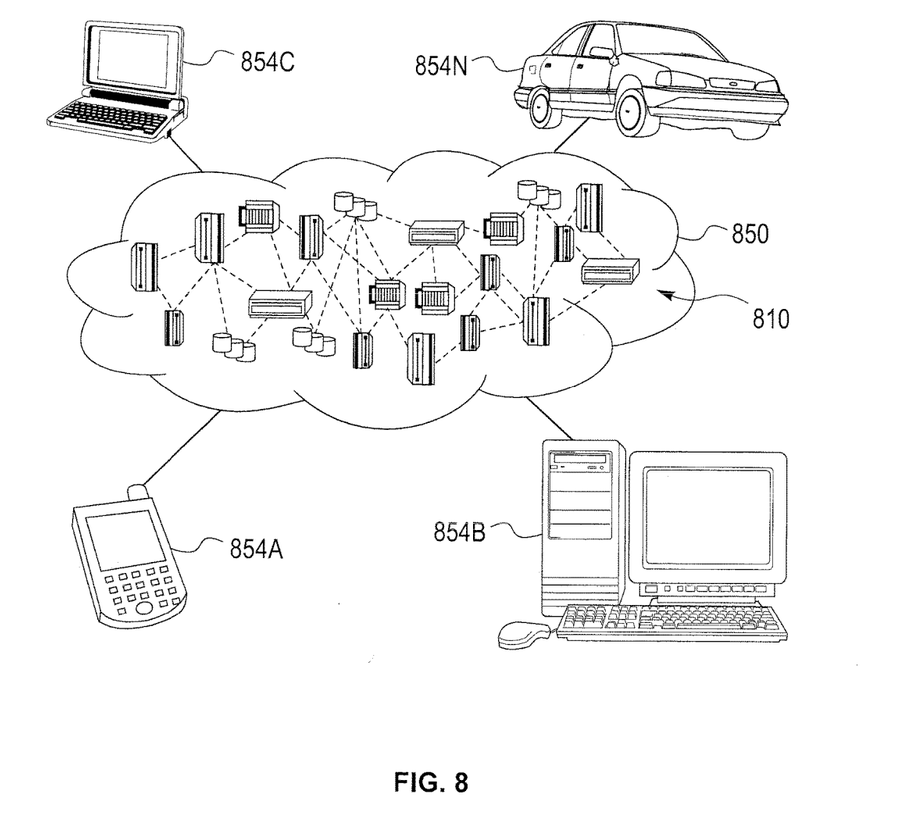
FIG. 8 shows an exemplary cloud computing environment, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
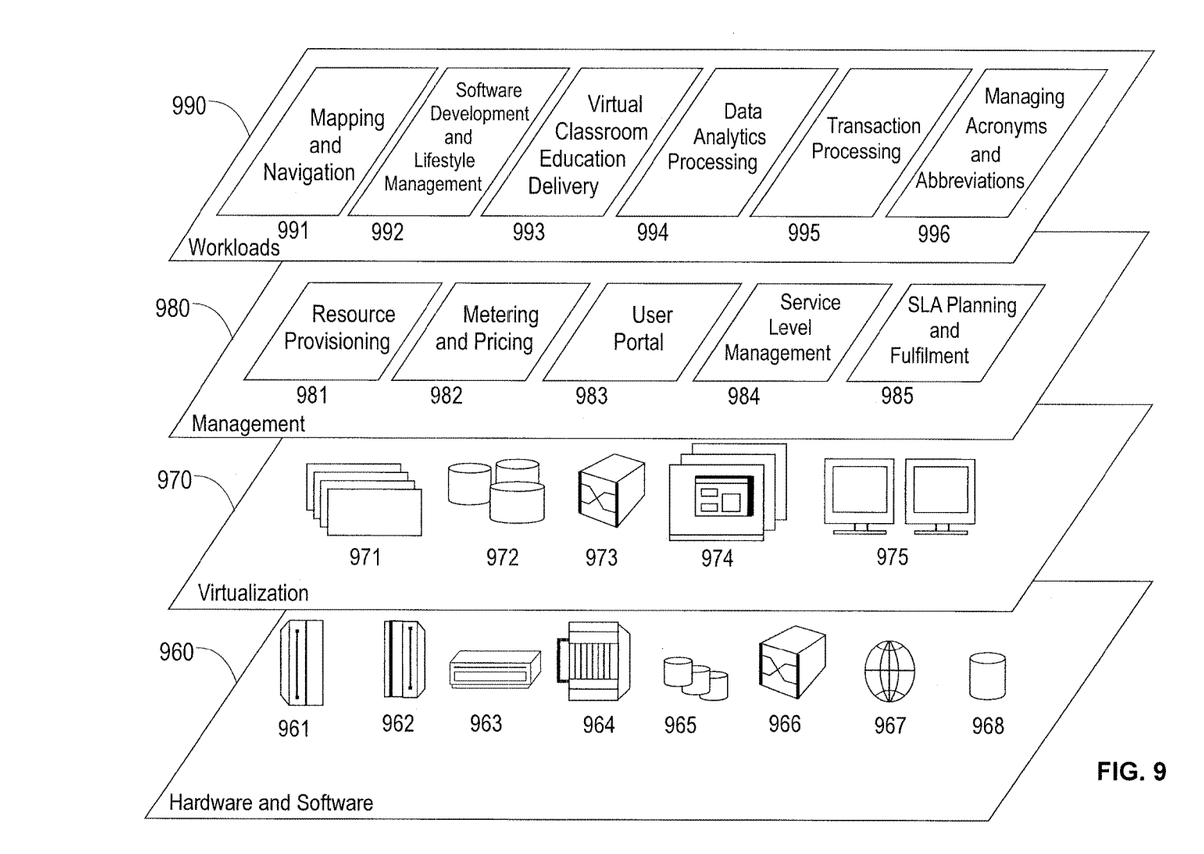
FIG. 9 shows an exemplary set of functional abstraction layers provided by the cloud computing environment shown in FIG. 8, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and managing acronyms and abbreviations used in the naming of physical database objects 996.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
  extracting, ranking, and annotating, by a processor, content in
  (i) one or more forms used on websites,
  (ii) a source code of open source software available in a source management system, and
  (iii) one or more existing data design projects that include mappings between logical data model objects and physical data model objects, the content selected from the group consisting of terms and abbreviations for the terms, wherein an extracted term is annotated using an abbreviation for the extracted term, and an extracted abbreviation is annotated using a term for the extracted abbreviation;
  storing, in a knowledge base, the content, respective annotations for the content, and respective ranks for the content; and
  given an input data structure that lacks identifiers of a given type for data objects therein, automatically generating, by the processor, suggested identifiers of the given type for the data objects based on the content, the respective annotations for the content, and the respective ranks for the content stored in the knowledge base, wherein the suggested identifiers of the given type are selected from the group consisting of the terms and the abbreviations for the terms.

2. The method of claim 1, wherein the suggested identifiers of the given type comprise one or more of the terms stored in the knowledge base.

3. The method of claim 1, wherein a respective rank for the content is based on an occurrence frequency of the content in one of (i) the one or more forms, (ii) the source code, and (iii) the one or more existing data design projects.

4. The method of claim 1, wherein said generating step comprises statistically matching existing identifiers in the input data structure to entries in the knowledge base.

5. The method of claim 1, wherein said generating step comprises evaluating a context of the data objects defined by analysis of relations between objects in the knowledge base.

6. The method of claim 5, wherein the relations between objects in the knowledge base consist of relationships between tables, table-column ownership, and instance-table ownership.

7. The method of claim 1, wherein the content is extracted, ranked, and annotated based on analyses of the one or more forms, the source code, and the one or more existing data design projects.

8. The method of claim 1, wherein extracting, ranking, and annotating the content in the one or more existing data design projects comprises analyzing dictionaries and glossaries defined within the one or more existing data design projects.

9. The method of claim 1, wherein the content from the one or more forms is extracted from fields in the one or more forms.

10. The method of claim 1, further comprising forming web form triples to store in the knowledge base, where each of the web form triples includes (i) a term used in a given one of the one or more forms, (ii) an abbreviation for the term, and (iii) an occurrence value indicating a number of occurrences of the term in the given one of the one or more forms.

11. The method of claim 1, further comprising forming source code triples to store in the knowledge base, where each of the source code triples includes (i) an abbreviation used in the source code, (ii) a term for the abbreviation, and (iii) an occurrence value indicating a number of occurrences of the abbreviation in the source code.

12. The method of claim 1, further comprising forming existing projects triples to store in the knowledge base, where each of the existing projects triples includes (i) an abbreviation used in a physical data model, (ii) a term for the abbreviation used in a logical data model, and (iii) an occurrence value indicating a number of occurrences of the abbreviation in the physical data model.

13. The method of claim 1, further comprising generating a logical representation of the input data structure, using the suggested identifiers of the given type.

14. The method of claim 13, wherein the input data structure is a physical database.

15. A computer program product for managing terms and abbreviations for the terms, the computer program product comprising a computer readable storage medium having program instructions embodied therewith, the program instructions executable by a computer to cause the computer to perform a method comprising:
  extracting, ranking, and annotating, by a processor, content in
  (i) one or more forms used on websites,
  (ii) a source code of open source software available in a source management system, and
  (iii) one or more existing data design projects that include mappings between logical data model objects and physical data model objects, the content selected from the group consisting of the terms and the abbreviations for the terms, wherein an extracted term is annotated using an abbreviation for the extracted term, and an extracted abbreviation is annotated using a term for the extracted abbreviation;
  storing, in a knowledge base, the content, respective annotations for the content, and respective ranks for the content; and
  given an input data structure that lacks identifiers of a given type for data objects therein, automatically generating, by the processor, suggested identifiers of the given type for the data objects based on the content, the respective annotations for the content, and the respective ranks for the content stored in the knowledge base, wherein the suggested identifiers of the given type are selected from the group consisting of the terms and the abbreviations for the terms.

16. The computer program product of claim 15, wherein said generating step comprises statistically matching existing identifiers in the input data structure to entries in the knowledge base.

17. The computer program product of claim 15, wherein said generating step comprises evaluating a context of the data objects defined by analysis of relations between objects in the knowledge base.

18. The computer program product of claim 17, wherein the relations between objects in the knowledge base consist of relationships between tables, table-column ownership, and instance-table ownership.

19. A system, comprising:
  a processor for extracting, ranking, and annotating content in
  (i) one or more forms used on websites,
  (ii) a source code of open source software available in a source management system, and
  (iii) one or more existing data design projects that include mappings between logical data model objects and physical data model objects, the content selected from the group consisting of terms and abbreviations for the terms, wherein an extracted term is annotated using an abbreviation for the extracted term, and an extracted abbreviation is annotated using a term for the extracted abbreviation;
  a knowledge base for storing the content, respective annotations for the content, and respective ranks for the content;
  wherein the processor, given an input data structure that lacks identifiers of a given type for data objects therein, automatically generates suggested identifiers of the given type for the data objects based on the content, the respective annotations for the content, and the respective ranks for the content stored in the knowledge base, wherein the suggested identifiers of the given type are selected from the group consisting of the terms and the abbreviations for the terms.

* * * * *